US008310813B2

(12) United States Patent
Fujita et al.

(10) Patent No.: US 8,310,813 B2
(45) Date of Patent: Nov. 13, 2012

(54) SEALING MATERIAL FOR ELECTROLYTIC CAPACITOR AND ELECTROLYTIC CAPACITOR EMPLOYING THE SEALING MATERIAL

(75) Inventors: Hiroaki Fujita, Tokyo (JP); Kazuhiko Kimura, Tokyo (JP); Masatoshi Iemura, Tokyo (JP); Masashi Ozawa, Tokyo (JP); Makoto Ashiura, Kanagawa (JP); Tetsuji Kawazura, Kanagawa (JP)

(73) Assignees: Nippon Chemi-Con Corporation, Tokyo (JP); The Yokohama Rubber Co., Ltd., Tokyo (JP)

( * ) Notice: Subject to any disclaimer, the term of this patent is extended or adjusted under 35 U.S.C. 154(b) by 294 days.

(21) Appl. No.: 12/597,408

(22) PCT Filed: Mar. 31, 2008

(86) PCT No.: PCT/JP2008/000831
§ 371 (c)(1),
(2), (4) Date: Apr. 20, 2010

(87) PCT Pub. No.: WO2008/136175
PCT Pub. Date: Nov. 13, 2008

(65) Prior Publication Data
US 2010/0232088 A1    Sep. 16, 2010

(30) Foreign Application Priority Data
Apr. 25, 2007   (JP) .................... 2007-116225

(51) Int. Cl.
*H01G 2/10* (2006.01)
(52) U.S. Cl. ........ 361/517; 361/516; 361/519; 361/311; 361/313; 361/305
(58) Field of Classification Search ............. 361/517, 361/516, 519, 523–525, 528–530, 537–540; 252/242, 374
See application file for complete search history.

(56) References Cited

U.S. PATENT DOCUMENTS

| | | | | |
|---|---|---|---|---|
| 6,491,992 B1 * | 12/2002 | Koizumi et al. | ............... | 428/34 |
| 6,690,573 B2 * | 2/2004 | Honda et al. | .................. | 361/509 |
| 7,667,953 B2 * | 2/2010 | Uzawa et al. | ................. | 361/504 |
| 7,956,134 B2 * | 6/2011 | Ashiura et al. | ................ | 525/374 |
| 2005/0124764 A1 * | 6/2005 | Onoi et al. | .................... | 525/242 |

FOREIGN PATENT DOCUMENTS

| | | |
|---|---|---|
| EP | 0 944 103 | 9/1999 |
| EP | 1 777 237 | 4/2007 |
| EP | 1 983 027 | 10/2008 |
| EP | 2 045 289 | 4/2009 |
| EP | 2 070 960 | 6/2009 |
| JP | 06-172547 | 6/1994 |
| JP | 7307254 | 11/1995 |
| JP | 9106932 | 4/1997 |
| JP | 11288853 | 10/1999 |
| JP | 2000173876 | 6/2000 |
| JP | 2001048929 | 2/2001 |
| JP | 2003109860 | 4/2003 |
| JP | 2004510858 | 4/2004 |
| JP | 2007231244 | 9/2007 |
| WO | 2008/136175 | 11/2008 |

OTHER PUBLICATIONS

European Patent Application No. 08720697.5 Extended European Search Report dated Nov. 29, 2010, 5 pages.

* cited by examiner

*Primary Examiner* — Nguyen T Ha

(57) ABSTRACT

An electrolytic capacitor sealer is formed of a modified butyl rubber composition obtained by using an organic peroxide to crosslink a modified butyl rubber composition which has been modified by reacting butyl rubber with a compound (a) having in the molecule a nitroxide free radical that is stable at room temperature even in the presence of oxygen, a radical initiator (b), and a bifunctional or higher radical polymerizable monomer (c), and of a modified butyl rubber composition obtained by compounding a radical polymerizable monomer (c) with a modified butyl rubber composition that has been obtained by reacting butyl rubber with a compound (a) having in the molecule a nitroxide free radical that is stable at room temperature even in the presence of oxygen and a radical initiator (b), and then crosslinking the composition thus obtained with an organic peroxide.

23 Claims, No Drawings

SEALING MATERIAL FOR ELECTROLYTIC CAPACITOR AND ELECTROLYTIC CAPACITOR EMPLOYING THE SEALING MATERIAL

RELATED APPLICATIONS

This application claims priority from PCT/JP2008/000831 filed on Mar. 31, 2008 which claims priority from Japanese Application 2007-116225 filed on Apr. 25, 2007.

TECHNICAL FIELD

The present invention relates to an electrolytic capacitor sealer composed of a modified butyl rubber composition obtained by crosslinking a modified butyl rubber composition with an organic peroxide, and to an electrolytic capacitor using this sealer.

BACKGROUND ART

In a conventional electrolytic capacitor, a driving electrolyte solution is soaked into a capacitor element comprising an electrode foil with lead wires leading to the electrodes, which is coiled with intervening separators. This capacitor element is contained in an outer case in the form of a tube with a closed bottom, and a sealer is then mounted on the open end of the outer case. The opening is then sealed by swaging to form the electrolytic capacitor.

However, electrolytic capacitors are now being used at higher ambient temperatures of around 125° C. in automobile components and inverter lighting. The conventional electrolytic capacitor described above cannot withstand long-term use under such high-temperature conditions. That is, during long-term use at a high temperature of 125° C. the electrolytic solution sealed inside the outer case swells the seal rubber, which undergoes thermal oxidation deterioration, thereby reducing the strength and air-tightness of the seal and detracting from the properties of the electrolytic capacitor. Normally, as such an electrolytic capacitor sealer, sealing rubber formed from butyl rubber or ethylene propylene rubber is used.

To resolve these problems, as shown in Patent Documents 1 to 4, it has been proposed that a highly heat-resistant peroxide-cured (crosslinked) butyl rubber be used for the sealer of an electrolytic capacitor. As shown in Patent Document 5, moreover, it has also been proposed that uncrosslinked butyl rubber be crosslinked in the presence of an organic oxide and a polyfunctional monomer having an electron withdrawing group as a means of obtaining highly-heat resistant peroxide butyl rubber.

Patent Document 1: Japanese Patent Application Laid-open No. H9-106932
Patent Document 2: Japanese Patent Application Laid-open No. H11-288853
Patent Document 3: Japanese Patent Application Laid-open No. 2000-173876
Patent Document 4: Japanese Patent Application Laid-open No. 2003-109860
Patent Document 5: Japanese Patent Application Laid-open No. H6-172547

However, although the sealers disclosed in Patent Documents 1 to 4 above have improved properties in comparison with conventional sealers using resin-cured butyl rubber, their performance may not be satisfactory. In particular, although partially crosslinked butyl rubber is sold commercially as suitable butyl rubber for peroxide crosslinking, such rubber has not been suitable for sealers due to problems of workability and the like.

In the method described in Patent Document 5, in which an uncrosslinked butyl rubber is crosslinked in the presence of an organic peroxide and a polyfunctional monomer having an electron withdrawing group, there is a risk of severe reversion, making such rubber unsuitable for sealers, which need to have stable properties.

DISCLOSURE OF THE INVENTION

It is an object of the present invention, which was achieved in light of the above problems of prior art, to provide an electrolytic capacitor sealer which crosslinked with an organic peroxide but is not liable to reversion as in the method described in Patent Document 5, and which fulfills the requirements of long-term heat resistance and the like, along with an electrolytic capacitor using this sealer.

To resolve the aforementioned problems, the present invention features an electrolytic capacitor sealer for sealing the opening of an outer case containing a capacitor element and an electrolytic solution, wherein the sealer is formed of a modified butyl rubber composition obtained by using an organic peroxide to crosslink a modified butyl rubber composition that has been modified by reacting butyl rubber with a compound (a) having in the molecule a nitroxide free radical that is stable at room temperature even in the presence of oxygen, a radical initiator (b), and a bifunctional or higher radical polymerizable monomer (c).

To resolve the aforementioned problems, the present invention features an electrolytic capacitor sealer for sealing the opening of an outer case containing a capacitor element and an electrolytic solution, wherein the sealer is formed of a modified butyl rubber composition obtained by using an organic peroxide to crosslink a modified butyl rubber composition which has been modified by reacting butyl rubber with a compound (a) having in the molecule a nitroxide free radical that is stable at room temperature even in the presence of oxygen, a radical initiator (b), a bifunctional or higher radical polymerizable monomer (c) and radical polymerizable monomer (d) having an alkoxysilyl group.

To resolve the aforementioned problems, the present invention features an electrolytic capacitor sealer for sealing the opening of an outer case containing a capacitor element and an electrolytic solution, wherein the sealer is formed of a modified butyl rubber composition obtained by compounding a bifunctional or higher radical polymerizable monomer (c) with a modified butyl rubber composition that has been modified by reacting butyl rubber with a compound (a) having in the molecule a nitroxide free radical that is stable at room temperature even in the presence of oxygen and a radical initiator (b), and then crosslinking the thus obtained composition with an organic peroxide.

2,2,6,6-tetramethyl-1-piperidinyl oxy radical or a derivative thereof can be used as a compound (a) having in the molecule a nitroxide free radical that is stable at room temperature even in the presence of oxygen, while a monomer containing an electron withdrawing group can be used as a bifunctional or higher radical polymerizable monomer (c), and a monomer having an electron withdrawing group can be used as a radical polymerizable monomer (d) having an alkoxysilyl group.

The aforementioned modified butyl rubber composition may containing a reinforcing agent such as carbon, talc, mica, silica or clay, and 2 to 200 parts by weight of clay or talc per 100 parts by weight of rubber components including the modified butyl rubber composition is especially desirable. Fired clay is especially desirable as the clay. A silane coupling agent may also be included in the aforementioned modified butyl rubber composition.

The aforementioned modified butyl rubber composition preferably has a compression set (105° C.×70 hr) of 60% or less, a rubber hardness (JIS-A) of 60 to 95, and a surface insulation resistance of the rubber of $10^4$ MΩ or more.

Another mode of the present invention is an electrolytic capacitor element wherein the opening of the outer case containing the capacitor and electrolytic solution is sealed with a sealer having a composition such as those described above.

With the present invention it is possible to obtain a sealer that fulfills the requirements of long-term heat resistance and the like without risk of reversion, along with an electrolytic capacitor.

BEST MODE FOR CARRYING OUT THE INVENTION

One embodiment of the invention is explained in detail below. The electrolytic capacitor sealer of the present invention forms part of an electrolytic capacitor by sealing the opening of an outer case containing a capacitor element and an electrolytic solution.

This sealer is composed of a modified butyl rubber composition obtained by using an organic peroxide to crosslink a modified butyl rubber composition which has been modified by reacting butyl rubber with a compound (a) having in the molecule a nitroxide free radical which is stable at room temperature even in the presence of oxygen, a radical initiator (b), and a bifunctional or higher radical polymerizable monomer (c).

This sealer is composed of a modified butyl rubber composition obtained by using an organic peroxide to crosslink a modified butyl rubber composition which has been modified by reacting butyl rubber with a compound (a) having in the molecule a nitroxide free radical that is stable at room temperature even in the presence of oxygen, a radical initiator (b), a bifunctional or higher radical polymerizable monomer (c) and a radical polymerizable monomer (d) having an alkoxysilyl group.

It is also composed of a modified butyl rubber composition obtained by compounding a bifunctional or higher radical polymerizable monomer (c) with a modified butyl rubber composition that has been modified by reacting butyl rubber with a compound (a) having in the molecule a nitroxide free radical that is stable at room temperature even in the presence of oxygen and a radical initiator (b), and then crosslinking the composition with an organic peroxide.

The butyl rubber that is modified in the present invention is a copolymer rubber of isobutylene (called butyl rubber (IIR)) with a small amount of isoprene (0.6 to 2.5 mol % of the total rubber), or a derivative such as chloride butyl rubber or bromide butyl rubber. Such rubbers are known in the industry, and a variety of commercial products are available.

The following compounds are given as examples of compound (a) used in the present invention, which has in the molecule a nitroxide radical that is stable at room temperature even in the presence of oxygen, but these examples are not limiting.

[C1]

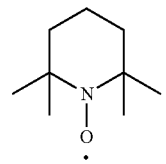

2,2,6,6-tetramethyl-1-piperidinyl oxy(TEMPO)

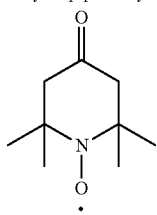

4-oxo TEMPO

[C2]

General Formulae

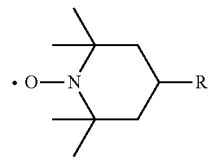

(1)

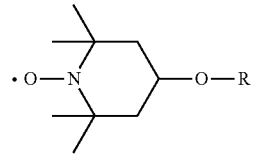

(2)

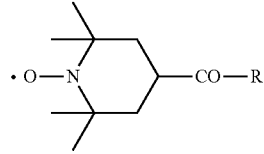

(3)

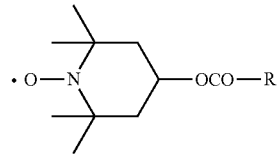

(4)

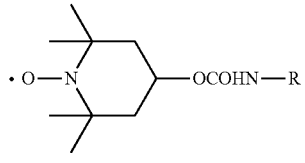

(5)

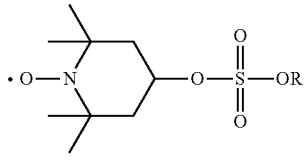

(6)

(where in Formulae (1) to (6), R indicates an organic group containing a functional group such as a $C_{1-30}$ alkyl group, allyl group, amino group, isocyanate group, hydroxyl group, thiol group, vinyl group, epoxy group, thiirane group, carboxyl group, carbonyl group-containing group (such as succinic anhydride, maleic anhydride, glutamic anhydride, phthalic anhydride and other cyclic acid anhydrides), amide group, ester group, imide group, nitrile group, thiocyan group, $C_{1-20}$ alkoxy group, silyl group, alkoxysilyl group or nitro group).

[C3]

(1)

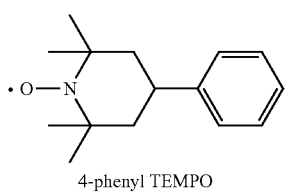
4-phenyl TEMPO

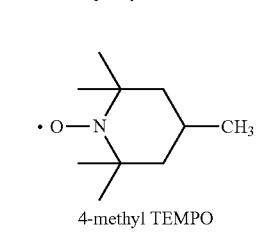
4-methyl TEMPO 4-ethyl TEMPO 4-chloro TEMPO (2)

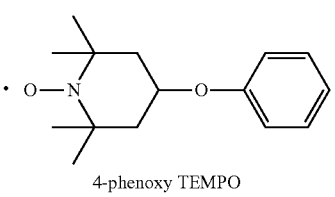
4-phenoxy TEMPO

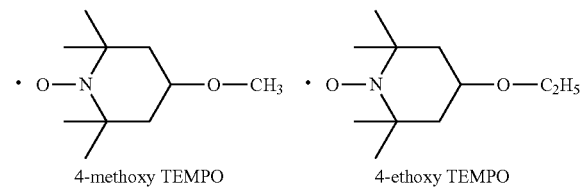
4-methoxy TEMPO      4-ethoxy TEMPO (3)

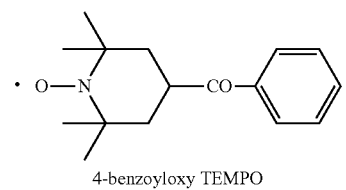
4-benzoyloxy TEMPO 4-methycarbonyl TEMPO      4-ethylcarbonyl TEMPO (4)

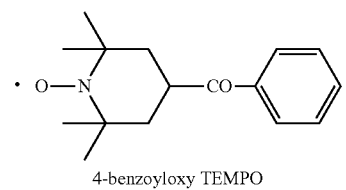
4-benzoyloxy TEMPO 4-acetoxy TEMPO      4-ethylcarbonyl TEMPO

[C4]

(5)

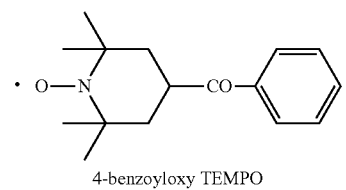
4-(N-phenylcarbamoyloxy) TEMPO 4-(N-methylcarbamoyloxy) TEMPO

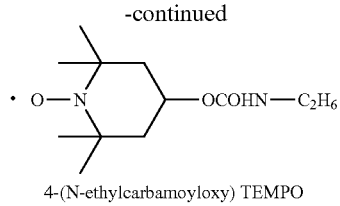
4-(N-ethylcarbamoyloxy) TEMPO
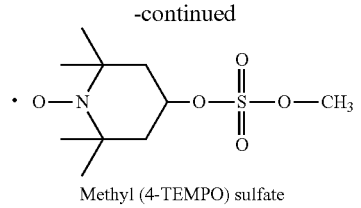
Methyl (4-TEMPO) sulfate
(6)
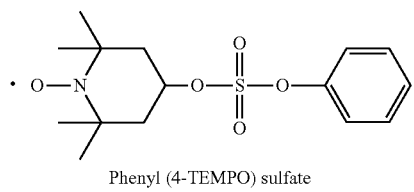
Phenyl (4-TEMPO) sulfate
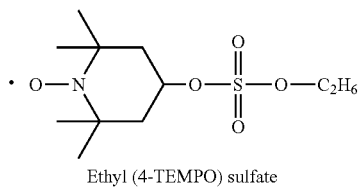
Ethyl (4-TEMPO) sulfate
[C5]
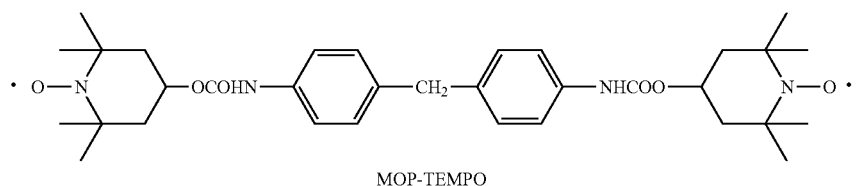
MOP-TEMPO
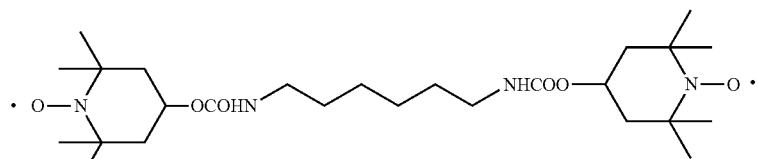
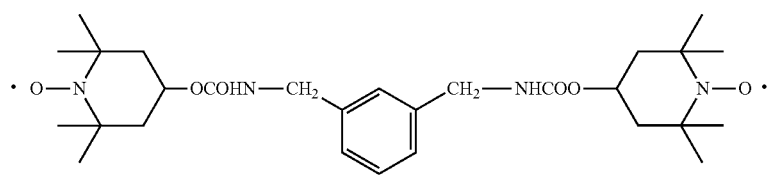
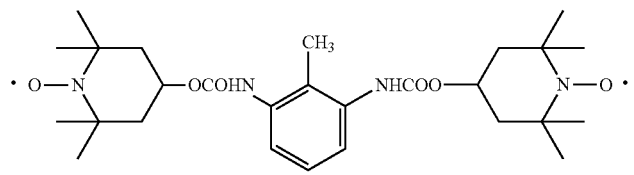
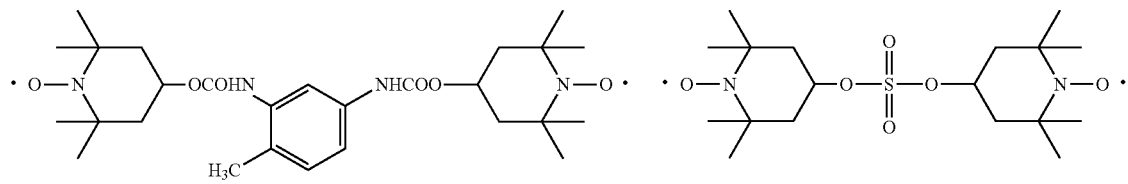
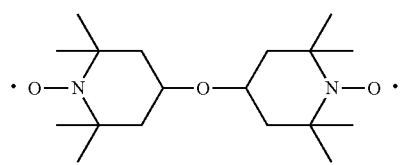

[C6]
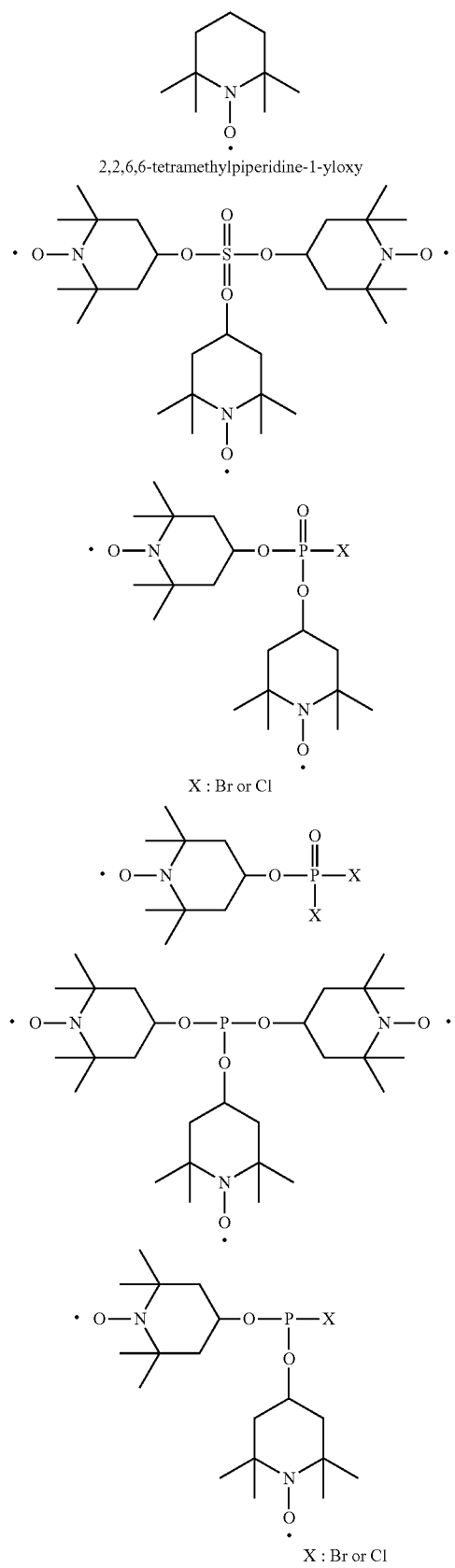
[C7]
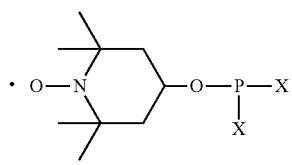
4-amino-2,2,6,6,-tetramethylpiperidinyloxy-TEMPO
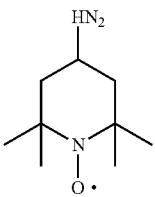
4-hydroxy-TEMPO
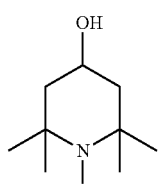
4-isocyanate-TEMPO
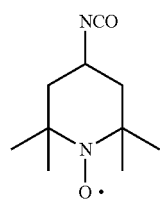
4-carboxyl-TEMPO
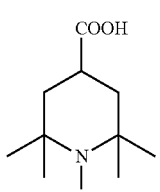
4-TEMPO-glycidyl ether
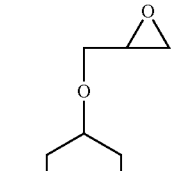
4-TEMPO-thioglycidyl ether

[C8]
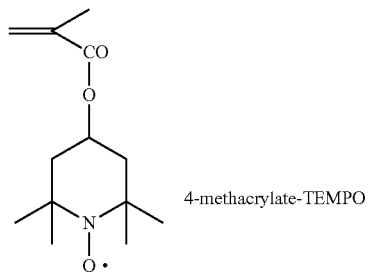
4-methacrylate-TEMPO
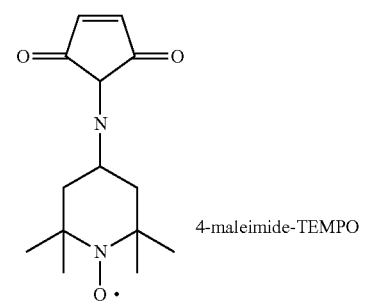
4-maleimide-TEMPO
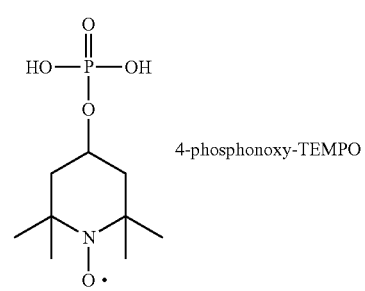
4-phosphonoxy-TEMPO
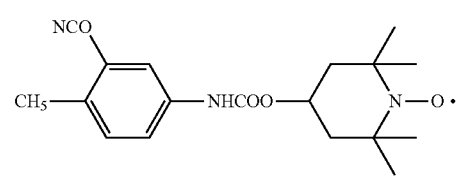
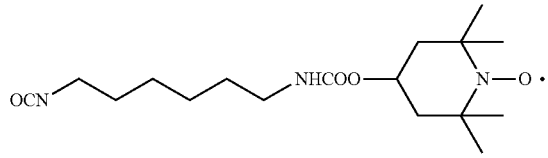
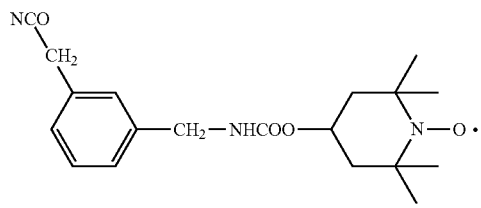
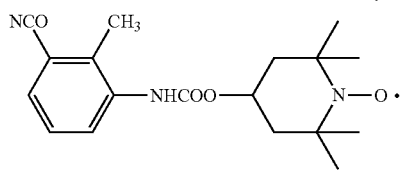
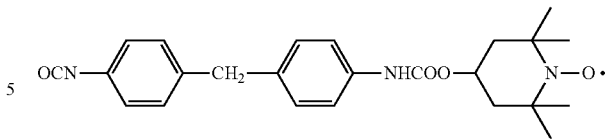
[C9]
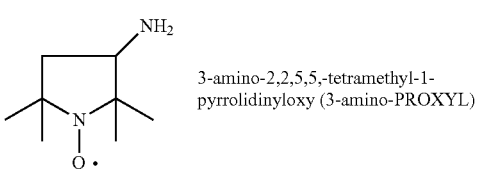
3-amino-2,2,5,5,-tetramethyl-1-pyrrolidinyloxy (3-amino-PROXYL)
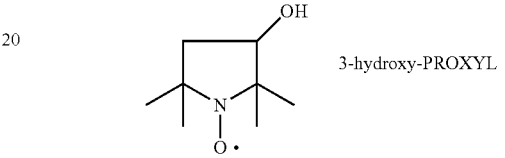
3-hydroxy-PROXYL
3-isocyanate-PROXYL
3-carboxyl-PROXYL
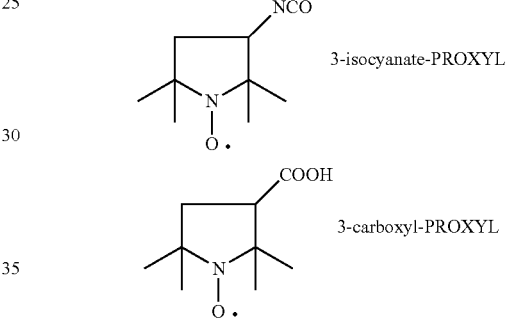
3-PROXYL-glycidyl ether
[C10]
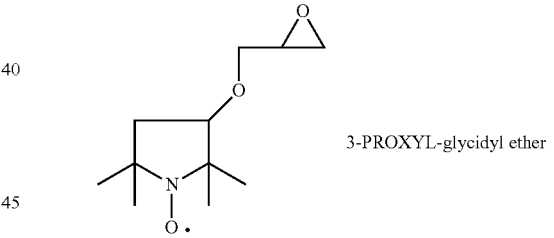
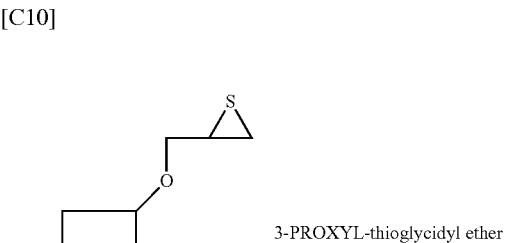
3-PROXYL-thioglycidyl ether
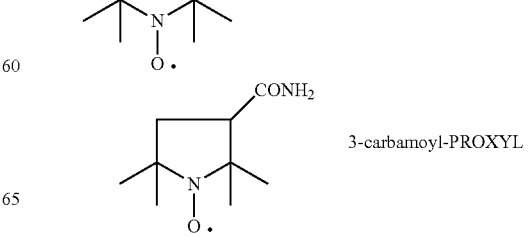
3-carbamoyl-PROXYL -continued

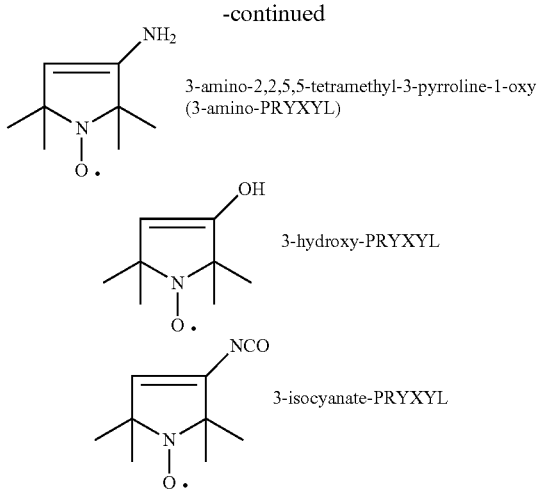

3-amino-2,2,5,5-tetramethyl-3-pyrroline-1-oxy (3-amino-PRYXYL)

3-hydroxy-PRYXYL 3-isocyanate-PRYXYL

[C11]

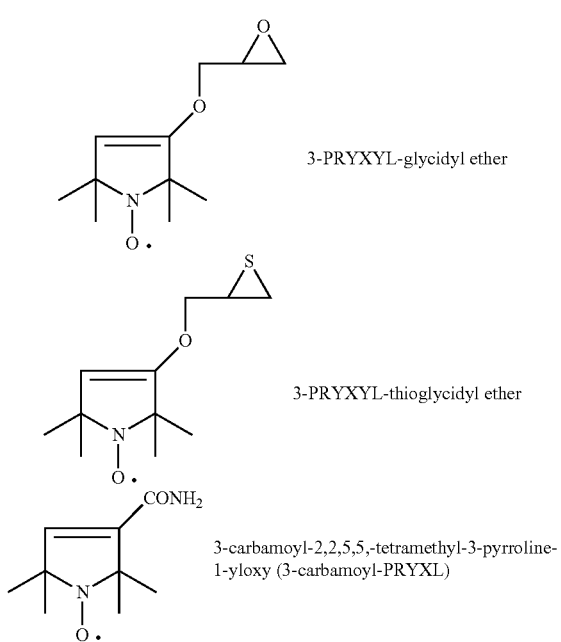

3-PRYXYL-glycidyl ether

3-PRYXYL-thioglycidyl ether 3-carbamoyl-2,2,5,5,-tetramethyl-3-pyrroline-1-yloxy (3-carbamoyl-PRYXL)

[C12]

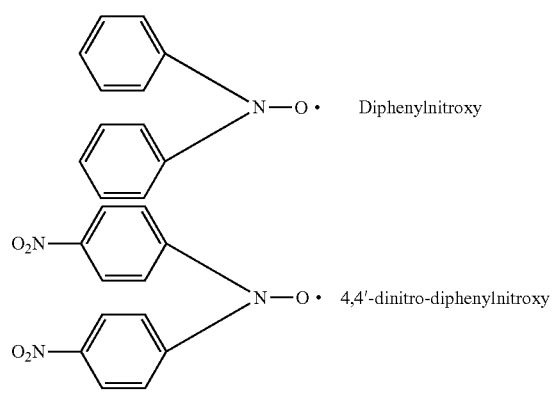

Diphenylnitroxy 4,4'-dinitro-diphenylnitroxy

-continued

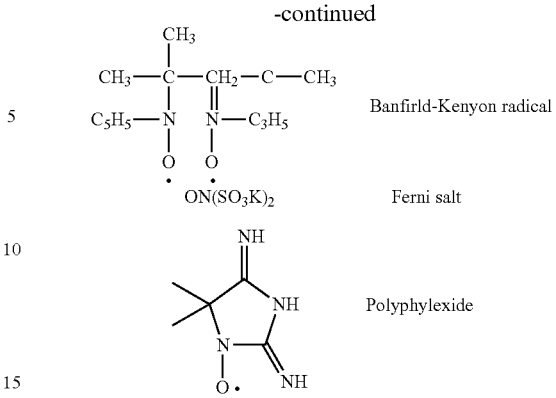

Banfirld-Kenyon radical

Ferni salt

Polyphylexide

[C13]

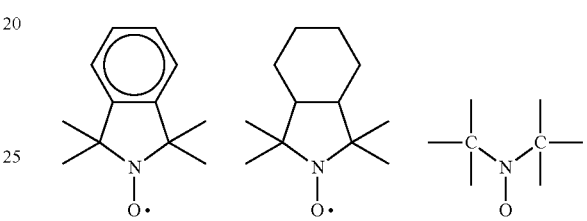

The amount of compound (a) used in the present invention is not particularly limited but is preferably 0.001 to 0.5 moles or more preferably 0.005 to 0.1 moles per 100 g of the butyl rubber to be modified. If too little is used less of the butyl rubber will be modified, while if too much is used subsequent crosslinking may not be achieved.

Any radical initiator capable of introducing the aforementioned compound (a) into the molecular chain of the butyl rubber can be used as radical initiator (b) in the present invention. Specific examples include benzoyl peroxide, t-butyl peroxybenzoate, dicumyl peroxide, t-butylcumyl peroxide, di-t-butyl peroxide, 2,5-dimethyl-2,5-di-t-butyl peroxyhexane, 2,5-dimethyl-2,5-di-t-butyl peroxy-3-hexine, 2,4-dichloro-benzoyl peroxide, di-t-butylperoxy-diisopropylbenzene, 1,1-bis(t-butylperoxy)-3,3,5-trimethyl-cyclohexane, n-butyl-4,4-bis(t-butylperoxy)valerate, 2,2-bis(t-butylperoxy)butane, diisobutyl peroxide, cumyl peroxyneodecanate, di-n-propyl peroxydicarbonate, diisopropyl peroxydicarbonate, di-Sec-butyl peroxydicarbonate, 1,1,3,3-tetramethylbutyl peroxyneodecanate, di(4-t-butylcyclohexyl)peroxydicarbonate, 1-cyclohexyl-1-methylethyl peroxyneodeccanate, di(2-ethoxyethyl)peroxydicarbonate, di(2-ethoxyhexyl)peroxydicarbonate, t-hexyl peroxyneodecanate, dimethoxybutyl peroxydicarbonate, t-butyl peroxyneodecanate, t-hexyl peroxypivalate, t-butyl peroxypivalate, di(3,5,5-trimethylhexanoyl)peroxide, di-n-octanoyl peroxide, dilauroyl peroxide, distearoyl peroxide, 1,1,3,3-tetramethylbutyl peroxy-2-ethylhexanoate, disuccinic acid peroxide, 2,5-dimethyl-2,5-di(2-ethylhexanoylperoxy)hexane, t-hexylperoxy-2-ethylhexanoate, di(4-methylbenzoyl)peroxide, t-butylperoxy-2-ethylhexanoate, a mixture of di(3-methylbenzoyl)peroxide, benzoyl(3-methylbenzoyl)peroxide and dibenzoyl peroxide, dibenzoyl peroxide, t-butyl peroxiisobutyrate and the like.

Typical examples of those capable of acting at low temperatures with the addition of a redox catalyst include dibenzoyl peroxide, paramenthane hydroperoxide, diisopropyl benzene hydroperoxide, 1,1,3,3-tetramethylbutyl hydroperoxide, cumene hydroperoxide, t-butyl hydroperoxide and the like. Adding these to the reaction system (mixed system, contact system) serves to generate carbon radicals in the butyl rubber, and compound (a) having stable free radicals reacts with these carbon radicals to produce a modified butyl rubber composition.

The added amount of radical initiator (b) in the present invention is not particularly limited but is preferably 0.001 to 0.5 moles or more preferably 0.005 to 0.2 moles per 100 g of butyl rubber to be modified. If too little is compounded too few hydrogen atoms may be taken from the butyl rubber chains, while if too much as added the principal chains of the butyl rubber may break down, greatly reducing the molecular weight of the rubber.

The bifunctional or higher radical polymerizable monomer (c) used in the present invention is not particular limited, but examples include ethylene di(meth)acrylate (where the term "ethylene di(meth)acrylate" includes both ethylene dimethacrylate and ethylene diacrylate; the same applies to other compounds below), trimethylolpropane (meth)acrylate, ethylene glycol di(meth)acrylate, polyethylene glycol di(meth)acrylate, 1,6-hexanediol di(meth)acrylate, tetramethylol methane tri(meth)acrylate, tetramethylol methane tetra(meth)acrylate, tris(2-hydroxyethyl)isocyanate tri(meth) acrylate, ethoxylated trimethylol propane tri(meth)acrylate, pentaerythritol tri(meth)acrylate, ethoxylated trimethylol propane tri(meth)acrylate, propoxylated trimethylol propane (meth)acrylate, propoxylated glyceryl (meth)acrylate, pentaerythritol tetra(meth)acrylate, ditrimethylol propane tetra (meth)acrylate, dipentaerythritol penta (meth)acrylate, ethoxylated pentaerythritol tetra(meth)acrylate, polysiloxane di(meth)acrylate, various urethane (meth)acrylates, various metal (meth)acrylates, polypropylene glycol di(meth)acrylate, N,N'-phenylene dimaleimide, bismaleimide diphenylmethane, N,N'-phenylene diacrylamide, divinylbenzene, triallyl isocyanurate and the like.

Of these, a monomer having an electron withdrawing group (such as a carbonyl group (ketone, aldehyde, ester, carboxylic acid, carboxylic acid salt, amide), nitro group, cyano group or the like) in the molecule is preferable from the standpoint of increasing the degree of modification.

The amount of this bifunctional or higher radical polymerizable monomer (c) that is used is not particularly limited but is preferably 0.001 to 0.5 moles or more preferably 0.005 to 0.2 moles per 100 g of butyl rubber to be modified. If too little is used crosslinking may not progress, while if too much is used the physical properties of the crosslinked product may be adversely affected.

In the present invention, component (d), which is a radical polymerizable monomer having an alkoxysilyl group, is represented as "[C14]" (where in [C14], R and $R^1$ are hydrocarbon groups, A is a radical polymerizable group, and n is an integer from 1 to 3).

[C14]

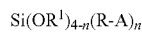

$$Si(OR^1)_{4-n}(R-A)_n$$

When n is 2 or 3, the $R^1$s may be different, and specific examples of $R^1$ in this case include methyl, ethyl, propyl, hexyl, dodecyl, octadecyl and other alkyl groups, cyclopropyl, cyclohexyl and other cycloalkyl groups, phenyl, benzyl and other aryl groups, or polyethylene glycol, polypropylene glycol and other polyoxyalkylene groups and the like.

When n is 2 or 3 the Rs may be different, and specific examples of R in this case include methyl, ethyl, propyl, hexyl, dodecyl, octadecyl and other alkyl groups, cyclopropyl, cyclohexyl and other cycloalkyl groups, phenyl, benzyl and other aryl groups and the like.

When n is 2 or 3 the radical polymerizable groups A may be different, and specific examples of A in this case include vinyl groups, allyl groups, styryl groups, (meth)acryloxy groups, (meth)acrylamide groups, vinyl halide groups, acrylonitrile groups and the like, but those that contain an electron withdrawing group (carbonyl group, halogen, cyano group or the like) are preferred. Of these, those having a (meth)acryloxy group are especially desirable.

The aforementioned radical polymerizable monomer having an alkoxysilyl group that is used in the present invention is not particularly limited, but desirable examples include vinyl methoxysilane, vinyl trimethoxysilane, vinyl ethoxysilane, vinyl triethoxysilane, γ-methacryloxypropyl trimethoxysilane, γ-methacryloxypropyl methyl dimethoxysilane, γ-methacryloxypropyl dimethyl methoxysilane, γ-acryloxypropyl methyl diethoxysilane, γ-acryloxypropyl dimethyl ethoxysilane, γ-acryloxypropyl triethoxysilane, N-(propyltriethoxysilane)maleimide and the like.

It is possible to use a hydrolytic condensation product of a radical polymerizable monomer, which has an alkoxysilyl group or an oligomer having two or more repeating units of siloxane bonds, and which is a silicone oil-type coupling agent having an alkoxysilyl group, and also which has a radical-polymerizable group.

The amount of component (d) used in the present invention is not particularly limited but is preferably 0.0001 to 0.5 moles or more preferably 0.0003 to 0.2 moles per 100 g of the butyl rubber to be modified. If too little is used it will not have the effect of improving the modulus and breaking strength of the crosslinked rubber, while too much of component (d) may have an adverse effect on the compression set of the crosslinked rubber.

In the present invention there is no particular limit on the method for modifying the butyl rubber with the aforementioned compound (a), initiator (b) and radical polymerizable monomers (c) and (d), but modification can be accomplished as follows for example.

A pre-mixed mixture of butyl rubber, compound (a) and initiator (b) is reacted at 150 to 220° C. in a nitrogen-exchanged sealed kneading machine, and once the temperature has cooled, radical polymerizable monomers (c) and (d) are added, nitrogen is exchanged again, and the mixture is kneaded at 150 to 220° C. to perform a reaction and obtain the desired modified butyl rubber composition.

The butyl rubber, compound (a), initiator (b) and radical polymerizable monomers (c) and (d) can also be kneaded and reacted together simultaneously. This modification can be performed using a biaxial extrusion kneader, uniaxial extrusion kneader, roll or the like.

Also 2 to 300 parts by weight or preferably 30 to 200 parts by weight of a reinforcing agent may be compounded with 100 parts by weight of a rubber composition including the aforementioned modified butyl rubber composition in the rubber composition of the present invention. Carbon black, talc, mica, silica or clay can be used individually or in combination for the reinforcing agent, and fired clay or talc is particularly desirable. This fired clay or talc can be compounded in the amount of 2 to 200 parts by weight per 100 parts by weight of a rubber composition containing the modified butyl rubber composition.

This fired clay is kaolinite (aluminum silicate) which has been fired at about 600° C. so that the structural water in the crystals is removed and the particle surfaces are made hydrophobic. As a result, it has good dispersibility during kneading with nonpolar butyl polymers, which increases the strength of the rubber seal, and because of its low surface activity it serves to reduce reactivity with atmospheric oxygen, so resistance to electrolytic solution and stable heat aging resistance can also be expected. Talc is a plate-shaped inorganic powder consisting mainly of magnesium silicate, and is capable of increasing the strength of the rubber seal and contributing heat resistance and gas impermeability.

A silane coupling agent or stearic acid may also be used as a processing aid to help with addition of the reinforcing agent.

An organic peroxide crosslinking agent is preferably compounded in the amount of preferably 0.05 to 15 parts by weight or more preferably 0.1 to 10 parts by weight.

Examples of organic peroxides that can be used as the aforementioned crosslinking agent include benzoyl peroxide, t-butyl peroxybenzoate, dicumyl peroxide, t-butylcumyl peroxide, di-t-butyl peroxide, 2,5-dimethyl-2,5-di-t-butyl peroxyhexane, 2,5-dimethyl-2,5-di-t-butylperoxy-3-hexine, 2,4-dichlorobenzoyl peroxide, di-t-butylperoxy-di-isopropylbenzene, 1,1-bis(t-butylperoxy)-3,3,5-trimethyl-cyclohexane, n-butyl-4,4-bis(t-butylperoxy)valerate, 2,2-bis(t-butylperoxy)butane and the like.

Styrene-isoprene-butadiene copolymer, chloroprene rubber, ethylene-propylene-diene ternary copolymer rubber, ethylene-propylene copolymer, ethylene-propylene-butene ternary copolymer, styrene-butadiene-styrene block copolymer, styrene-isoprene-styrene copolymer, styrene-ethylene-butene-styrene block copolymer, styrene-ethylene-propylene-styrene copolymer, polyethylene, polypropylene, polystyrene, polyaromatic vinyl, polyolefin, polyisoprene, various styrene-butadiene copolymers, various polybutadienes, acrylonitrile-butadiene copolymer, hydrogenated acrylonitrile-butadiene copolymer, acrylic rubber, silicone rubber, fluorine rubber, epichlorohydrin rubber, various polymethacrylic acid esters, various polyethers, various polysulfides, various polyvinyl ethers, various polyesters, various polyamides, cellulose, starch, various polyurethanes, various kinds of polyurea, various polyamines and the like can be compounded as other rubber components with the modified butyl rubber composition of the present invention, but preferably the compounded amount of the modified butyl rubber composition is 10% by weight or more of the rubber components.

In addition to the components mentioned above, other reinforcing agents (fillers), curing or crosslinking agents, curing or crosslinking accelerators, various oils, antiaging agents, plasticizers and various other additives commonly compounded with rubber compositions can be compounded with the rubber composition of the present invention, and these additives can be kneaded by ordinary methods to form a composition and used for curing or crosslinking. The compounded amounts of these additives can be the commonly added amounts to the extent that these do not interfere with the object of the present invention.

EXAMPLES

The present invention is explained further below by means of examples, but of course the scope of the present invention is not limited by these examples.

The raw materials used in the following examples are as follows.
(1) Butyl Rubber
    IIR:Butyl rubber (Bayer Co., BUTYL301)
(2) Compound (a) Having Nitroxide Free Radicals in the Molecule
    OH-TEMPO: 4-hydroxy-2,2,6,6-tetramethylpiperidinyl-1-oxyl (Asahi Denka Kogyo LA7RD)
(3) Radical Initiator (b)
    Dicumyl peroxide: (NOF Corp. Percumyl D)
    Di-t-butyl peroxide: (NOF Corp. Perbutyl D)
    1,3-bis-(t-butylperoxyisopropyl)benzene: Kayaku Akzo Corp. Perkadox 14-G)
(4) Bifunctional or Higher Radical Polymerizable Monomer (c)
    Ethylene dimethacrylate: (Tokyo Chemical Industry)
    Trimethylol propane trimethacrylate: (Shin-Nakamura Chemical Co., NK Ester TMPT)
    Ditrimethylol propane tetraacrylate (Sartomer Co. SR-355)
(5) Radical Polymerizable Monomer (d) Having Alkoxysilyl Group
    γ-methacryloxypropyl trimethoxysilane: (Tokyo Chemical Industry)
(6) Organic Peroxide
    Dicumyl peroxide (NOF Corp. Percumyl D-40 (40% dilution of Percumyl D))

Preparation examples of modified butyl rubber compositions using these raw materials are shown below. These preparation examples 1 to 6 have not been peroxide crosslinked, and organic peroxides and reinforcing agents are later added to these modified butyl rubber compositions as shown in the examples below to prepared cured seal rubber.

(1) Preparation Example 1 of modified IIR composition (IIR-EDM)

350.0 g of IIR, 32.6 g of dicumyl peroxide as component (b), and 32.2 g of OH-TEMPO as component (a) were placed in a sealed Banbury mixer set to a temperature of 60° C., and mixed for 10 minutes. The resulting mixture was nitrogen exchanged for 5 minutes while being kneaded in a sealed Banbury mixer set to 100° C. During kneading the temperature was raised to 185° C., and kneading was continued for 20 minutes. Part of the resulting polymer was dissolved in toluene, and the polymer was isolated and refined by re-precipitation. The refined polymer was analyzed by $^1$H-NMR to confirm introduction of TEMPO units (alkoxyamino groups). The introduction rate was 0.156 mol %.

The reaction system was first heated to 150° C., 37.0 g of ethylene dimethacrylate as component (c) was added, and the mixture was nitrogen exchanged for 5 minutes while being kneaded. During kneading the temperature was raised to 185° C. and kneading was continued for 20 minutes. Part of the resulting polymer was dissolved in toluene, and the polymer was isolated and refined by re-precipitation. The refined product was analyzed by IR analysis and $^1$H-NMR. Absorption derived from an ester carbonyl was observed near 1720 cm$^{-1}$, and in $^1$H-NMR a signal from an ethylene proton was observed near 4.37 ppm, while signals from methacrylate olefin protons were observed near 6.12 and 5.60 ppm.

(2) Preparation Example 2 of modified IIR composition (IIR-GT)

350.0 g of IIR, 30.4 g of di-t-butyl peroxide as (b) and 32.2 g of OH-TEMPO as (a) were mixed for 10 minutes in a sealed Banbury mixer set to 60° C. The resulting mixture was nitrogen exchanged for 5 minutes while being kneaded in a sealed Banbury mixer set to 100° C. During kneading the temperature was raised to 185° C. and kneading was continued for 20 minutes. Part of the resulting polymer was dissolved in toluene, and the polymer was isolated and refined by re-precipitation. The refined product was analyzed by $^1$H-NMR, to confirm introduction of TEMPO units (alkoxyamino groups). The introduction rate was 0.259 mol %.

With the temperature of the reaction system being first set at 150° C., 44.9 g of trimethylol propane trimethacrylate (TMPT) as (c) was added, and the mixture was nitrogen exchanged for 5 minutes while being kneaded. During kneading the temperature was raised to 185° C. and kneading was continued for 15 minutes. Part of the resulting polymer was dissolved in toluene, and the polymer was isolated and refined by reprecipitation. The refined produced was analyzed by IR analysis and $^1$H-NMR. Absorption derived from ester carbonyl was observed near 1720 cm-1, and in $^1$H-NMR signals derived from TMPT were observed near 6.09 ppm, 5.75 ppm and 4.16 ppm, confirming introduction of TMPT with 2 residual olefins. The introduction rate was 0.185 mol %.

(3) Preparation Example 3 of modified IIR composition (IIR-GTS)

350.0 g of IIR, 30.4 g of di-t-butyl peroxide as (b) and 32.2 g of OH-TEMPO as (a) were mixed for 10 minutes in a sealed Banbury mixer set to 60° C. The resulting mixture was nitrogen exchanged for 5 minutes while being kneaded in a sealed Banbury mixer set to 100° C. During kneading the temperature was raised to 185° C. and kneading was continued for 20 minutes. Part of the resulting polymer was dissolved in toluene, and the polymer was isolated and refined by re-precipitation. The refined product was analyzed by $^1$H-NMR, to confirm introduction of TEMPO units (alkoxyamino groups). The introduction rate was 0.303 mol %.

With the temperature of the reaction system being first set at 150° C., 44.9 g of ditrimethylol propane tetraacrylate (DTMP) as (c) was added, and the mixture was nitrogen exchanged for 5 minutes while being kneaded. During kneading the temperature was raised to 185° C. and kneading was continued for 15 minutes. Part of the resulting polymer was dissolved in toluene, and the polymer was isolated and refined by re-precipitation. The refined produced was analyzed by IR analysis and $^1$H-NMR. Absorption derived from ester carbonyl was observed near 1720 cm$^{-1}$, and in $^1$H-NMR signals derived from DTMP were observed near 6.39, 6.10, 5.96, 4.12 and 3.30 ppm, confirming introduction of DTMP with 3 residual olefins. The introduction rate was 0.23 mol %.

(4) Preparation Example 4 of modified IIR (IIR-GTe)

350.0 g of IIR, 24.2 g of 1,3-bis-(t-butylperoxyisopropyl)benzene as (b) and 32.2 g of OH-TEMPO as (a) were mixed for 10 minutes in a sealed Banbury mixer set to 60° C. The resulting mixture was nitrogen exchanged for 5 minutes while being kneaded in a sealed Banbury mixer set to 100° C. During kneading the temperature was raised to 185° C. and kneading was continued for 20 minutes. Part of the resulting polymer was dissolved in toluene, and the polymer was isolated and refined by re-precipitation. The refined product was analyzed by $^1$H-NMR, to confirm introduction of TEMPO units (alkoxyamino groups). The introduction rate was 0.360 mol %.

With the temperature of the reaction system being first set at 150° C., 44.9 g of ditrimethylol propane tetraacrylate (DTMP) as (c) was added, and the mixture was nitrogen exchanged for 5 minutes while being kneaded. During kneading the temperature was raised to 185° C. and kneading was continued for 15 minutes. Part of the resulting polymer was dissolved in toluene, and the polymer was isolated and refined by re-precipitation. The refined produced was analyzed by IR analysis and $^1$H-NMR. Absorption derived from ester carbonyl was observed near 1720 cm-1, and in $^1$H-NMR signals derived from DTMP were observed near 6.39, 6.10, 5.96, 4.12 and 3.30 ppm, confirming introduction of DTMP with 3 residual olefins. The introduction rate was 0.185 mol %.

(5) Preparation Example 5 of modified IIR composition (OHT-IIR)

350.0 g of IIR, 24.2 g of 1,3-bis-(t-butylperoxyisopropyl)benzene as (b) and 32.2 g of OH-TEMPO as (a) were mixed for 10 minutes in a sealed Banbury mixer set to 60° C. The resulting mixture was nitrogen exchanged for 5 minutes while being kneaded in a sealed Banbury mixer set to 100° C. During kneading the temperature was raised to 185° C. and kneading was continued for 20 minutes. Part of the resulting polymer was dissolved in toluene, and the polymer was isolated and refined by re-precipitation. The refined product was analyzed by $^1$H-NMR, to confirm introduction of TEMPO units (alkoxyamino groups). The introduction rate was 0.317 mol %.

No (c) was included in the modified butyl rubber composition of this Preparation Example 5, and instead (c) was added during subsequent curing (addition of organic peroxide and reinforcing agent) to prepare the sealer of the present invention.

(6) Preparation Example 6 of modified IIR composition (IIR-GTSI)

350.0 g of IIR, 24.2 g of 1,3-bis-(t-butylperoxyisopropyl)benzene as (b) and 32.2 g of OH-TEMPO as (a) were mixed for 10 minutes in a sealed Banbury mixer set to 60° C. The resulting mixture was nitrogen exchanged for 5 minutes while being kneaded in a sealed Banbury mixer set to 100° C. During kneading the temperature was raised to 165° C. and kneading was continued for 20 minutes. Part of the resulting polymer was dissolved in toluene, and the polymer was isolated and refined by re-precipitation. The refined product was analyzed by $^1$H-NMR, to confirm introduction of TEMPO units (alkoxyamino groups). The introduction rate was 0.360 mol %.

With the temperature of the reaction system being first set at 150° C., 11.2 g of ditrimethylol propane tetraacrylate (DTMP) as (c) and 5.8 g of γ-methacryloxypropyl trimethoxysilane as (d) were added, and nitrogen exchange was performed for 5 minutes with kneading. During kneading the temperature was raised to 185° C., and kneading was continued for 15 minutes. Part of the resulting polymer was dis solved in toluene, and the polymer was isolated and refined by re-precipitation. The refined produced was analyzed by IR analysis and $^1$H-NMR. Absorption derived from ester carbonyl was observed near 1720 cm-1, and in $^1$H-NMR signals derived from DTMP were observed near 6.39, 6.10, 5.96, 4.12 and 3.30 ppm, confirming introduction of DTMP with 3 residual olefins. The introduction rate was 0.084 mol %. A signal derived from γ-methacryloxypropyl trimethoxysilane was also observed near 3.55 ppm, and the introduction rate for this was 0.015 mol %.

(7) Examples 1 to 4, 7

The modified butyl rubber compositions of Preparation Examples 2 to 6 above were kneaded for 6 minutes in the following proportions (parts by weight) in a 150 cc kneader. These were then further kneaded with an 8-inch open roll to obtain rubber compositions, which were used as sealers for electrolytic capacitors. A capacitor element impregnated with an electrolytic solution containing γ-butyrolactone was enclosed in an outer case, and the opening of this outer case was sealed with the aforementioned sealer to prepare an electrolytic capacitor, which was then evaluated as follows. Examples 1 through 4 and 7 below correspond to Preparation Examples 2 to 6 above.

In this case, the trimethylol propane trimethacrylate (TMPT) in Example 4 corresponds to the bifunctional or higher radical polymerizable monomer (c) that is added subsequently in Preparation Example 5.

(8) Comparative Example 1

In the same way, ordinary butyl rubber (Reg-IIR) that had been resin cured as Comparative Example 1 was kneaded in the following proportions (parts per weight) for 6 minutes in a 150 cc kneader. This was then further kneaded with an 8-inch open roll to obtain a rubber composition, which was used for the sealer of an electrolytic capacitor. A capacitor element impregnated with an electrolytic solution containing γ-butyrolactone was enclosed in an outer case, and the opening of this outer case was sealed with the aforementioned sealer to prepare an electrolytic capacitor, which was then evaluated as follows.

(9) Comparative Example 2

Next, ordinary butyl rubber (Reg-IIR) was crosslinked with organic peroxide as Comparative Example 2, and was then kneaded in the following proportions (parts by weight) for 6 minutes in a 150 cc kneader. This was then further kneaded with an 8-inch open roll to obtain a rubber composition, which was used as the sealer of an electrolytic capacitor. A capacitor element impregnated with an electrolytic solution containing γ-butyrolactone was enclosed in an outer case, and the opening of this outer case was sealed with the aforementioned sealer to prepare an electrolytic capacitor, which was then evaluated as follows.

The dicumyl peroxide (DCP-40C) in the aforementioned Examples 1 to 4 and 7 and Comparative Example 2 is used as an organic peroxide for purposes of peroxide curing. The SRF carbon, hard clay, fired clay and talc in Examples 1 to 4 and 7 and Comparative Examples 1 and 2 are used as reinforcing agents, and are used in the same amounts in all examples and comparative examples.

| | Ex. 1 | Ex. 2 | Ex. 3 | Ex. 4 | Ex. 7 | Comp. Ex. 1 (resin cured) | Comp. Ex. 2 (peroxide cured) |
|---|---|---|---|---|---|---|---|
| IIR-GT (Prep. Ex. 2) | 120 | | | | | | |
| IIR-GTS (Pre. Ex. 3) | | 127 | | | | | |
| IIR-GTe (Prep Ex. 4) | | | 127 | | | | |
| OHT-IIR (Prep. Ex. 5) | | | | 117 | | | |
| IIR-GTSI (Prep. Ex. 6) | | | | | 110 | | |
| Regular-IR | | | | | | 100 | 100 |
| SRF carbon | 50 | 50 | 50 | 50 | 50 | 50 | 50 |
| Fired clay | 100 | 100 | 100 | 100 | 100 | 100 | 100 |
| Silane coupling agent | 1 | 1 | 1 | 1 | 1 | 1 | 1 |
| Stearin agent | 0.5 | 0.5 | 0.5 | 0.5 | 0.5 | 0.5 | 0.5 |
| TMPT | | | | 12 | | | |
| Alkylphenol formaldehyde resin | | | | | | 8 | |
| DCP-40C | 20 | 15 | 3 | 15 | 3 | | 15 |

| | | | Ex. 1 | Ex. 2 | Ex. 3 | Ex. 4 | Ex. 7 | Comp. Ex. 1 | Comp. Ex. 2 |
|---|---|---|---|---|---|---|---|---|---|
| Initial properties | Hardness | Degrees | 74 | 75 | 76 | 70 | 72 | 67 | Unable to form sheet |
| | Tensile strength | MPa | 4.1 | 5.0 | 4.0 | 3.0 | 4.1 | 5.2 | |
| | Compression set | % | 35 | 22 | 20 | 35 | 43 | 29 | |
| | Surface insulation resistance | MΩ | $10^9$ | $10^9$ | $10^9$ | $10^9$ | $10^9$ | $10^9$ | |
| Change in properties after 360 hrs heat aging at 125° C. | Change in hardness | Degrees | +8 | +4 | +2 | +2 | +10 | −16 | |
| | Change in TB | % | −9 | −11 | −15 | −15 | −3 | −86 | |

(10) Evaluation Results 1

As shown in Table 1 above, in Comparative Example 1 in which a sealer was prepared using a butyl rubber composition composed of ordinary butyl rubber (Reg-IIR) that had been resin cured, the initial properties were roughly equivalent to those in Examples 1 to 4 and 7, but in terms of physical changes after 360 hours of heat aging at 125° C., hardness declined and there was a much greater loss of tensile strength, confirming that this rubber could not function as a sealer for a capacitor.

In Comparative Example 2 in which a sealer was prepared using a butyl rubber composition composed of ordinary butyl rubber (Reg-IIR) that had been cured (crosslinked) with an organic peroxide, heat resistance could not even be tested because it was impossible to prepare a sheet for constructing the sealer.

On the other hand, in Examples 1 to 4 and 7 in which sealers were prepared from the modified butyl rubber composition of the present invention, the initial characteristics were shown to be those desired for the sealer of an electrolytic capacitor, with compression set (105° C.×70 hrs) of 60% or less, rubber hardness (JIS-A) of 60 through 95 and surface insulation resistance of the rubber of $10^4$ MΩ or more. The degree of change after heat aging was also much less than in Comparative Example 1, and the low rate of change in tensile strength means that there was little permeation of electrolytic solution. Consequently, longer life of the electrolytic capacitor can be achieved with the sealers according to Examples 1 to 4 and 7.

(11) Examples 5, 6

As shown in Table 1, in Example 1 above SRF carbon, fired clay, stearic acid and a silane coupling agent were added as reinforcing agents and the like, so to confirm the effects of the reinforcing agents on the sealer, Example 5 was prepared with SRF carbon alone as the reinforcing agent and Example 6 was prepared with SRF carbon and hard clay as reinforcing agents, and the properties of the sealers were tested by the same methods used in Example 1 above in which SRF carbon and fired clay were used the reinforcing agents. The results are given in Table 2 below.

TABLE 2

| | | | Ex. 5 | Ex. 6 | Ex. 1 |
|---|---|---|---|---|---|
| IIR-GT (Preparation example 2) | | | 120 | 120 | 120 |
| SRF Carbon | | | 50 | 50 | 50 |
| Hard clay | | | | 100 | |
| Fired clay | | | | | 100 |
| Stearic acid | | | 0.5 | 0.5 | 0.5 |
| Silane coupling agent | | | 1 | 1 | 1 |
| DCP-40C (organic peroxide) | | | 20 | 20 | 20 |
| Initial characteristics | Hardness | Degrees | 45 | 70 | 74 |
| | TB (Tensile strength) | MPa | 2.8 | 3.2 | 4.1 |
| | Compression set | % | 45 | 42 | 35 |
| | Surface insulation resistance | MΩ | $10^9$ | $10^9$ | $10^9$ |
| Change in properties after 360 hrs heat aging at 125° C. | Change in hardness from heat aging | Degrees | +10 | +6 | +8 |
| | Change in TB from heat aging | % | −20 | −15 | −9 |

*Heat aging test: Physical change after 125° C. × 360 h
Compression set: 105° C.×70 h 25% compression
Surface insulation resistance: 500 V applied

(12) Evaluation Results 2

It was possible to prepare a sealer in Example 5 using SRF carbon alone as the reinforcing agent, but the initial characteristics were inferior to those obtained in Examples 1 to 4 and 7 above. However, in the long-term heat resistance test this sealer performed better in terms of changes in hardness and tensile strength from heat aging than the sealer using resin-cured butyl rubber of Comparative Example 1.

In the case of Example 6 using hard clay and Example 1 using fired clay, the initial characteristics of the sealer including hardness and compression set were better than in Comparative Example 1, and even after 360 hours at 125° C. the rate of change in tensile strength from heat aging was low, with little permeation of electrolytic solution. In Example 1 using fired clay in particular, the initial characteristics and long-term heat resistance characteristics were found to be better than in Example 6 using hard clay.

(13) Examples 8, 9

As shown in Table 1, in Example 7 above SRF carbon, fired clay, stearic acid and a silane coupling agent were added as reinforcing agents and the like, but in order to verify the effects of the reinforcing agents on the sealer, Example 9 was prepared with SRF carbon alone as the reinforcing agent and Example 8 was prepared with SRF carbon and talc together as the reinforcing agents, and the properties of the sealers were tested by the same methods used in Example 7 above in which SRF carbon and fired clay were used the reinforcing agents. The results are shown in Table 3 below.

TABLE 3

| | | | Ex. 7 | Ex. 8 | Ex. 9 |
|---|---|---|---|---|---|
| IIR-GTSI (Preparation example 6) | | | 110 | 110 | 110 |
| SRF Carbon | | | 50 | 50 | 50 |
| Fired clay | | | 100 | | |
| Talc | | | | 100 | |
| Silane coupling agent | | | 1 | 1 | 1 |
| Stearin agent | | | 0.5 | 0.5 | 0.5 |
| DCP-40C | | | 3 | 4 | 4.5 |
| Initial characteristics | Hardness | Degrees | 72 | 79 | 47 |
| | Tensile strength | MPa | 4.1 | 4.9 | 3.8 |
| | Compression set | % | 43 | 58 | 43 |
| | Surface insulation resistance | MΩ | $10^9$ | $10^9$ | $10^9$ |
| Change in properties after 360 hrs heat aging at 125° C. | Change in hardness from heat aging | Degrees | +10 | +8 | +7 |
| | Change in TB from heat aging | % | −3 | +3 | −36 |

(14) Evaluation Results 3

It was possible to prepare a sealer in Example 9 using SRF carbon alone as the reinforcing agent, but the initial characteristics were inferior to those obtained in Examples 1 to 4 and 7 above. However, in the long-term heat resistance test this sealer performed better in terms of changes in hardness and tensile strength from heat aging than the sealer using resin-cured butyl rubber of Comparative Example 1.

In Example 8 and Example 7, which were compounded with talc and fired clay, respectively, the hardness, tensile strength and other initial characteristics of the sealer were better than in Comparative Example 7, and even after 360 hours at 125° C. the rate of change in tensile strength from heat aging was low, with little permeation of electrolytic solution. In Example 8 using talc in particular, compression set was lower but the hardness, strength and long-term heat resistance characteristics were confirmed to be even better than those obtained Example 7, in which fired clay was added.

The invention claimed is:

1. An electrolytic capacitor sealer for sealing an opening of an outer case containing a capacitor element and an electrolytic solution, wherein
the sealer is formed of a modified butyl rubber composition obtained by using an organic peroxide to crosslink a modified butyl rubber composition that has been modified by reacting butyl rubber with a compound (a) having in the molecule a nitroxide free radical that is stable at room temperature even in the presence of oxygen, a radical initiator (b), and a bifunctional or higher radical polymerizable monomer (c).

2. The electrolytic capacitor sealer according claim 1, wherein the compound (a) having in the molecule a nitroxide free radical that is stable at room temperature even in the presence of oxygen is 2,2,6,6tetramethyl-1-piperidinyl oxy radical or a derivative thereof.

3. The electrolytic capacitor sealer according to claim 1, wherein the bifunctional or higher radical polymerizable monomer (c) contains an electron withdrawing group.

4. The electrolytic capacitor sealer according to claim 1, wherein the modified butyl rubber composition contains a reinforcing agent.

5. The electrolytic capacitor sealer according to claim 4, wherein the reinforcing agent is any of carbon, talc, mica, silica and clay.

6. The electrolytic capacitor sealer according to claim 5, wherein the clay is fired clay.

7. The electrolytic capacitor sealer according to claim 5, wherein clay or talc is included in an amount of 2 to 200 parts by weight per 100 parts by weight of rubber components including the modified butyl rubber composition.

8. The electrolytic capacitor sealer according to claim 1, wherein the butyl rubber composition contains a silane coupling agent.

9. The electrolytic capacitor sealer according to claim 1, wherein the modified butyl rubber composition has a compression set (105° C.×70 hr) of 60% or less, a rubber hardness (JIS-A) of 60 to 95, and a surface insulation resistance of rubber of $10^4$ MΩ or more.

10. An electrolytic capacitor, wherein an opening of an outer case containing a capacitor element and an electrolytic solution is sealed with the sealer according to claim 1.

11. An electrolytic capacitor sealer for sealing an opening of an outer case containing a capacitor element and an electrolytic solution, wherein
the sealer is formed of a modified butyl rubber composition obtained by using an organic peroxide to crosslink a modified butyl rubber composition that has been modified by reacting butyl rubber with a compound (a) having in the molecule a nitroxide free radical that is stable at room temperature even in the presence of oxygen, a radical initiator (b), a bifunctional or higher radical polymerizable monomer (c) and a radical polymerizable monomer (d) having an alkoxysilyl group.

12. The electrolytic capacitor sealer according to claim 11, wherein the radical polymerizable monomer (d) having an alkoxysilyl group has an electron withdrawing group.

13. The electrolytic capacitor sealer according to claim 11, wherein the compound (a) having in the molecule a nitroxide free radical that is stable at room temperature even in the presence of oxygen is 2,2,6,6tetramethyl-1-piperidinyl oxy radical or a derivative thereof.

14. The electrolytic capacitor sealer according to claim 11, wherein the bifunctional or higher radical polymerizable monomer (c) contains an electron withdrawing group.

15. The electrolytic capacitor sealer according to claim 11, wherein the modified butyl rubber composition contains a reinforcing agent.

16. The electrolytic capacitor sealer according to claim 11, wherein the modified butyl rubber composition has a compression set (105° C.×70 hr) of 60% or less, a rubber hardness (JIS-A) of 60 to 95, and a surface insulation resistance of rubber of $10^4$ MΩ or more.

17. An electrolytic capacitor, wherein an opening of an outer case containing a capacitor element and an electrolytic solution is sealed with the sealer according to claim 11.

18. An electrolytic capacitor sealer for sealing an opening of an outer case containing a capacitor element and an electrolytic solution, wherein
the sealer is formed of a modified butyl rubber composition obtained by compounding a bifunctional or higher radical polymerizable monomer (c) with a modified butyl rubber composition that has been modified by reacting butyl rubber with a compound (a) having in the molecule a nitroxide free radical that is stable at room temperature even in the presence of oxygen and a radical initiator (b), and then crosslinking the composition thus obtained with an organic peroxide.

19. The electrolytic capacitor sealer according to claim 18, wherein the compound (a) having in the molecule a nitroxide free radical that is stable at room temperature even in the presence of oxygen is 2,2,6,6tetramethyl-1-piperidinyl oxy radical or a derivative thereof.

20. The electrolytic capacitor sealer according to claim 18, wherein the bifunctional or higher radical polymerizable monomer (c) contains an electron withdrawing group.

21. The electrolytic capacitor sealer according to claim 18, wherein the modified butyl rubber composition contains a reinforcing agent.

22. The electrolytic capacitor sealer according to claim 18, wherein the modified butyl rubber composition has a compression set (105° C.×70 hr) of 60% or less, a rubber hardness (JIS-A) of 60 to 95, and a surface insulation resistance of rubber of $10^4$ MΩ or more.

23. An electrolytic capacitor, wherein an opening of an outer case containing a capacitor element and an electrolytic solution is sealed with the sealer according to claim 18.

* * * * *